(12) United States Patent
Daburger et al.

(10) Patent No.: US 9,044,117 B2
(45) Date of Patent: Jun. 2, 2015

(54) AUTOMATIC COFFEE MAKER AND TUBE VALVE

(75) Inventors: Josef Daburger, Siegsdorf-Hammer (DE); Ulrike Dommann, Traunstein (DE); Michael Steffl, Marquartstein (DE)

(73) Assignee: KRAFT FOODS R&D, INC., Deerfield, IL (US)

( * ) Notice: Subject to any disclaimer, the term of this patent is extended or adjusted under 35 U.S.C. 154(b) by 781 days.

(21) Appl. No.: 13/263,963

(22) PCT Filed: Apr. 20, 2010

(86) PCT No.: PCT/EP2010/055141
§ 371 (c)(1),
(2), (4) Date: Apr. 25, 2012

(87) PCT Pub. No.: WO2010/124962
PCT Pub. Date: Nov. 4, 2010

(65) Prior Publication Data
US 2012/0199012 A1 Aug. 9, 2012

(30) Foreign Application Priority Data
Apr. 27, 2009 (DE) .......................... 10 2009 002 657

(51) Int. Cl.
*A47J 31/46* (2006.01)
*F16K 7/06* (2006.01)

(52) U.S. Cl.
CPC . *A47J 31/46* (2013.01); *F16K 7/063* (2013.01)

(58) Field of Classification Search
CPC ...... F16K 7/063; A61M 39/284; A61M 39/28
USPC ........................................ 99/300, 302 R, 295
See application file for complete search history.

(56) References Cited

U.S. PATENT DOCUMENTS

| 4,262,585 | A | * | 4/1981 | Leuschner et al. | ............. | 99/280 |
| 5,309,820 | A | * | 5/1994 | Baxter et al. | ................... | 99/280 |
| 6,220,147 | B1 | * | 4/2001 | Priley | ............................. | 99/323 |
| 6,817,280 | B2 | * | 11/2004 | Hall et al. | ....................... | 99/292 |
| 7,168,444 | B2 | * | 1/2007 | Sesser et al. | ............ | 137/505.25 |

FOREIGN PATENT DOCUMENTS

| CN | 200957020 Y | 10/2007 |
| DE | 7935124 U1 | 3/1980 |
| DE | 8815998 | 4/1990 |

(Continued)

OTHER PUBLICATIONS

State Intellectual Property Office, P.R. China, English translation of First Office Action dated Jul. 2, 2013 for China Application 201080018590.0 (4 pgs.).

(Continued)

*Primary Examiner* — Reginald L Alexander
(74) *Attorney, Agent, or Firm* — Fitch, Even, Tabin & Flannery LLP

(57) ABSTRACT

An automatic coffee maker comprises a tube valve which has a passage tube for liquids and/or gases and a control device for controlling a throughput through the passage tube. The tube valve is improved by a direction changing device which changes an orientation of the passage tube during operation.

12 Claims, 7 Drawing Sheets

A' - A

(56) References Cited

FOREIGN PATENT DOCUMENTS

| | | |
|---|---|---|
| DE | 19540885 | 5/1996 |
| EP | 0151500 | 8/1985 |
| EP | 0151500 A1 | 8/1985 |
| EP | 1767135 A1 | 3/2007 |
| JP | 2005531466 A | 10/2005 |
| JP | 2008055377 A1 | 3/2008 |
| WO | 2008071024 | 6/2008 |
| WO | 2008138820 | 11/2008 |

OTHER PUBLICATIONS

State Intellectual Property Office, P.R. China, English translation of Search Report dated Jun. 25, 2013 for China Application 201080018590.0 (2 pgs.).

German Examination Report dated Aug. 29, 2013 for German Application 10 2009 002 657.6 (8 pgs.) and English translation (5 pgs.).

International Search Report for PCT/EP2010/055141 issued on Jun. 6, 2011.

* cited by examiner

A' - A

A' - A

AUTOMATIC COFFEE MAKER AND TUBE VALVE

CROSS REFERENCE TO RELATED APPLICATIONS

This application is a national phase application of International Application No. PCT/EP2010/055141, filed Apr. 20, 2010, designating the United States and claiming priority to German Application No. 10 2009 002 657.6, filed Apr. 27, 2009, both of which are incorporated by reference herein in their entirety.

FIELD

The invention concerns a coffee machine with a tube valve, which has a conduit for liquids and/or gases and a device for regulating the flow rate through the conduit. It also concerns a tube valve for a coffee machine. It is suitable for use with hot beverage dispensers in general, which prepare, in addition to coffee, other beverages such as tea, ready prepared tea blends or broths. For the sake of simplicity, the following text refers to, but is not limited to, coffee machines.

BACKGROUND

The adjustment of the flow of liquids and/or gases in coffee machines can serve, on one hand, to shut off and on the other to channel liquids or gases to certain functional units or pouring spouts. Depending on the valve position, for example, it is possible to feed hot water to a pipe for broth or steam to a steam pipe. In higher quality coffee machines, ceramic valves are used to regulate the quantity of liquids, in which an adjusting disk fitted with an outlet aperture is turned according to the chosen preparation, so that the outlet aperture forms a flow channel together with the inlet and outlet pipes.

Tube valves are well-known devices for the discharge of steam. They consist of a conduit through which liquid or gas is led and a pinch jaw which squeezes the conduit in such a way that its inner diameter is reduced. The flow rate and indirectly also the flow pressure is thereby adjusted.

SUMMARY

In one aspect, the function of the invention is to specify an outlet valve which allows the flow of liquids and/or gases to be channelled and is as insusceptible as possible to the accumulation of dirt.

This function is solved by a coffee machine of the type named at the beginning with a species, which changes the direction of the conduit during operation. A tube valve according to the invention is similarly fitted with such a direction changing device.

In one aspect, the invention basically takes advantage of the fact that the conduit or at least a large section of the tube of a tube valve has certain flexibility. This flexibility is necessary, as otherwise a sufficient adjustment of the flow rate through the conduit cannot be guaranteed. In one aspect, the invention takes double advantage of the flexibility of the tube, namely, in addition to restricting the flow rate through the conduit, the flow direction of liquids and/or gases can also be changed easily. The flexible conduit can in fact steer the fluids in different directions by simply moving the conduit back and forth. It can therefore also be used as a sort of multiple switch which can steer fluids into different channels.

In one aspect, the invention therefore relies on a combination of functions through the addition of a direction changing device to a conventional tube valve of the type named at the beginning. In addition to adjusting the flow rate, this makes it surprisingly easy to change the direction of and/or channel liquids and/or gases flowing through the tube, without the need for additional efforts in terms of materials or construction. The valve thus gains an important additional function, in only a small available space, which until now had to be performed by a separate switch.

A direction changing device can, for example, consist in a bi-directional sliding element which is connected permanently or loosely with a conduit, which aligns the conduit in different directions and/or moves its outlet. The directions can be allocated to various different preparation, maintenance, cleaning or other functions of the coffee machine.

A first embodiment involves at least one pinch jaw acting as a tube adjustment device. This means that the flow rate is regulated from outside the conduit and can therefore also be controlled externally. For this purpose a force is exerted on the conduit through the pinch jaw which affects the diameter of the tube. The pinch jaw can pinch the conduit in such a way that it at least reduces its passage diameter.

A preferably mechanical coupling of the pinch jaw with the direction changing device is particularly preferential. A coupling allows a change of direction of the conduit depending on the setting of the pinch jaw. A coupling can also be made in the opposite direction, in which case when the direction changing device is reset, the position of the pinch jaw will change accordingly. A bi-directional coupling is particularly preferable, so that by changing the position of the pinch jaw, the direction of the conduit can be changed and vice-versa. In doing so, the coupling can basically allocate several corresponding positions of the respective other element, preferably to a certain position of the pinch jaw or the direction changing device. The corresponding positions of the elements are then not only dependent on each other, but also on a chosen function of the coffee machine in operation. For example, at different settings of the direction changing device, the position of the pinch jaw can remain unchanged and only needs to be changed for a certain selected function of the coffee machine. The coupling of the pinch jaw and the direction changing device means, therefore, that the respective squeeze setting of the pinch jaw corresponds to an alignment of the conduit, which in turn corresponds to the respective preparation, maintenance or cleaning function of the coffee machine. The coupling thus serves for the automatic change of positions of the pinch jaw and the direction changing device inside the tube valve, depending on the respective function of the coffee machine.

In a further embodiment, the tube valve is designed as an outlet for a hot beverage dispenser and/or for a drainage and/or for gases. As a hot beverage dispenser spout, it conducts a hot beverage from a brewing chamber towards the spout of the coffee machine for hot beverages in the external area of the dispenser housing. A drainage outlet conducts liquids and/or gas to the outside, whereby the drainage serves the purpose of disposing of residual water and/or steam or similar substances, for example substances from a brewing or foaming process. The drainage prevents residual liquids and/or gases from remaining inside the machine when another function of the coffee machine is activated, thus preventing the development of dysfunctions. The valve serves as a gas outlet when, for example, it is fed with steam, which is conducted into a steam nozzle, for example for foaming milk.

The advantages of the tube valve are evident in particular when used as a pouring spout for hot beverages. Contrary to a ceramic valve, with which valve technology comes into contact with the hot beverage itself, with the tube valve according to one aspect of the invention, the hot beverage only passes through the conduit, whilst in particular the mechanical elements of the tube valve, for example a pinch jaw, do not come into contact with the beverage. This means that it is practically impossible for the mechanical functional parts of the tube valve to accumulate dirt.

The tube valve according to one aspect of the invention is also particularly suitable for use as a drainage outlet, because steam or residual brewing water which needs to be eliminated mostly still have a very high temperature. The conduit can therefore be made from a temperature-resistant material. In addition, drainage usually takes place at a high initial pressure, with the result that the mechanical burden of a conduit is very high at a drainage outlet. This burden can be absorbed by the tube valve indirectly, for example by retaining the conduit inside a housing, which stabilises the conduit in areas which are subject to high pressure. When the conduit is under pressure, it is then supported by the housing which surrounds it completely. In contrast, in areas in which liquid and/or gas flows through at approximately atmospheric pressure, without such a stabilisation, it can have a free hanging design, for example.

The setting of the pinch jaw during operation can be regulated depending on the various preparation functions of the coffee machine selected. A user can, therefore, exert influence indirectly on the setting of the pinching devise by selecting a preparation function. The setting of the pinch jaw, for example, can be set up in such a way for the "brew coffee" preparation function, that the flow tube is not shut off. To increase the pressure, for example for the preparation of coffee with cream, the pinch jaw can be used to create a certain reduction of the flow rate through the conduit. For this, the pinch jaw shuts off the conduit only partially and the necessary pressure—preferably a pressure of at least 6 bar—is therefore produced.

At the end of a coffee preparation cycle, the pinch jaw on the other hand shut off the conduit completely, so that no residual brewing water drips out of the pouring spout after the brewing process, but is retained inside the tube valve. By selecting a subsequent drainage function, the setting of the pinch jaw can allow the unobstructed discharge of the residual brewing water.

With the aid of the pinch jaw setting, therefore, it is not only possible to vary the flow rate between free flowing to completely sealed off, but a reduction can also be achieved which allows adjustment of the flow rate and also the pressure of the gas and/or liquid upstream of the tube valve. An adjustment of pressure can be necessary, for example, for the subsequent processing of prepared hot beverages, such as coffee which has to be put under high pressure to generate cream.

According to a further advantageous embodiment, the pinching forces of the pinch jaw are adjusted by means of springs. The pinch jaw can be pushed from its pinch position onto the tube by a spring. The spring should preferably have a variable spring resistance and preferably have a flat characteristic curve. It serves in particular to balance tolerances of the conduit, for example its hardness and cross-section. If the pinch jaw is used to seal off the flow through the conduit with the help and support of the spring, if the pressure upstream of the valve is too high, the spring can slacken to such an extent that any excess pressure is released. The spring therefore, can act not only to compensate tolerances, but also as a sort of pressure relief valve.

A further advantageous embodiment includes a guide wheel with a guide rail for activating the flow changing device. The guide rail controls the flow changing device. The guide wheel can include a toothed ring, which makes it easier to control. At the same time, it can serve the coupling of the flow changing device with a pinch jaw. The guide rail can have the shape, for example, of a curved depression in the guide inside the guide wheel. A cog on the flow changing device can protrude into the depression. It serves the purpose of changing also the position of the flow changing device when the guide wheel is turned.

In addition, a pinch jaw guide is preferably provided which serves the purpose of adjusting the setting of the pinch jaw. The pinch jaw guide can also be allocated to a guide wheel. It can be designed to rest on the same guide wheel as the guide rail of the flow changing device, for example as a second rail on the other side of the guide wheel, on which the guide rail for the flow changing device is fitted. In this case, the guide wheel acts as a carrier for the guide rails of the flow changing device on one hand and of the pinch jaw device on the other. With the aid of the guide wheel and the guide elements fitted on or in the guide wheel, the pinch jaw and the flow changing device are coupled in such a way that the same pinch jaw setting is exactly allocated to the flow changing device.

It is preferable to use several pinch jaws, in particular two opposite facing pinch jaws, which can jointly pinch the conduit at a certain point along its length. In addition, or in alternative to this, several pinch jaws can be placed at staggered intervals along the length of the conduit. The pinch jaws and/or pairs of pinch jaws can, for example, ensure the multiple shut-off functions of the pinch jaws or a differentiated adjustment of the shut-off mechanism.

A particular advantage is obtained if the pinch jaw is designed to form part of a clamping lever. The clamping lever has a mount around which it can swivel. This makes it easy to adjust the position and the pinch effect of the component, in particular in combination with the already mentioned adjustment of the pinch jaws by means of springs.

A tube valve according to one aspect of the invention with a housing, in which the conduit is permanently connected to a tapping device and/or which houses a brewed liquid intake, is particularly preferable. A permanent connection can be achieved, for example, by connecting the tapping device or the brewed liquid intake to the conduit by means of the injection moulding process, for example two-component injection-moulding.

The tapping device allows containers with ready-made beverage concentrates to be tapped, so that their contents can be fed into the conduit. The brewed liquid intake serves the purpose of the intake of coffee pods or ground coffee through which hot water is then pumped to produce coffee, which is in turn conducted into the conduit of the tube valve. It should preferably be possible to remove the tube valve together with the tapping device or the brewed liquid intake out of the housing. The housing protects the tube valve on the outside and thus also serves the purpose of preventing the accumulation of dirt or the development of dysfunctions. The combination of the tube valve together with a tapping device or a brewed liquid intake as a removable part, serves the purpose of making it possible to remove the only element subject to the accumulation of dirt and therefore maintenance, namely the conduit, so that it can be cleaned and serviced separately.

In addition to the preferred design of the tube valve fitted with at least one pinch jaw, it can be designed alternatively or additionally with an elastic throat of the conduit as an adjustment device. The material of the tube can be designed or selected so the preset elasticity of the tube is able to withstand an established or maximum internal pressure. The pinch strength of the pinch jaw of the above described design can in this case, therefore be replaced by the established elasticity of the tube material. The use of pinch jaws can be dispensed with altogether if necessary. In this case the conduit regulates the flow rate also automatically, without the application of any active additional force from outside, as the elasticity of the throat automatically causes the inner diameter of the tube to vary, depending on the pressure upstream of the throat, thus causing a reduction or opening.

BRIEF DESCRIPTION OF THE DRAWINGS

Principles of certain aspects of the are explained in more detail below, based on drawings, by way of example. The following are shown.

Figure 9:
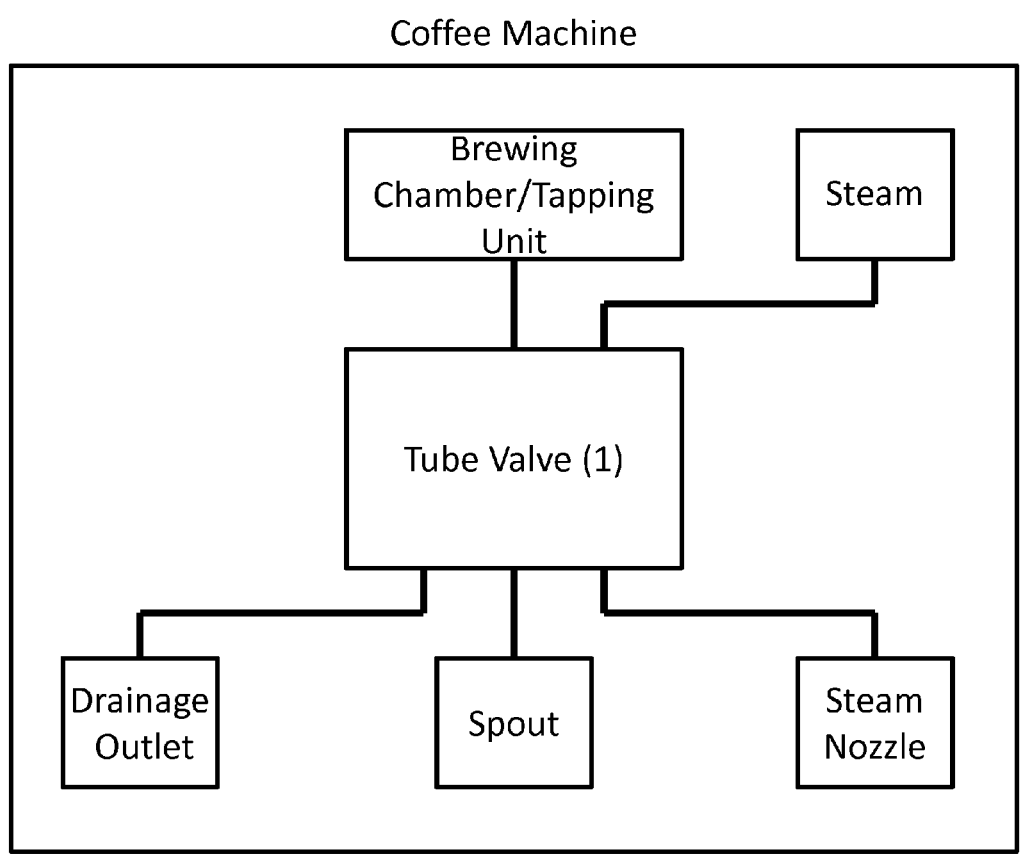
FIG. 9 is a schematic diagram of a coffee machine incorporating the tube valve.

The tube valve is designed as an outlet for a hot beverage dispenser and/or for a drainage and/or for gases, as shown schematically in FIG. 9. As a hot beverage dispenser spout, it conducts a hot beverage from a brewing chamber/tapping device towards the spout of the coffee machine for hot beverages in the external area of the dispenser housing. A drainage outlet conducts liquids and/or gas to the outside, whereby the drainage serves the purpose of disposing of residual water and/or steam or similar substances, for example substances from a brewing or foaming process. The drainage prevents residual liquids and/or gases from remaining inside the machine when another function of the coffee machine is activated, thus preventing the development of dysfunctions. The valve serves as a gas outlet when, for example, it is fed with steam, which is conducted into a steam nozzle, for example for foaming milk.

DETAILED DESCRIPTION

Figure 1:
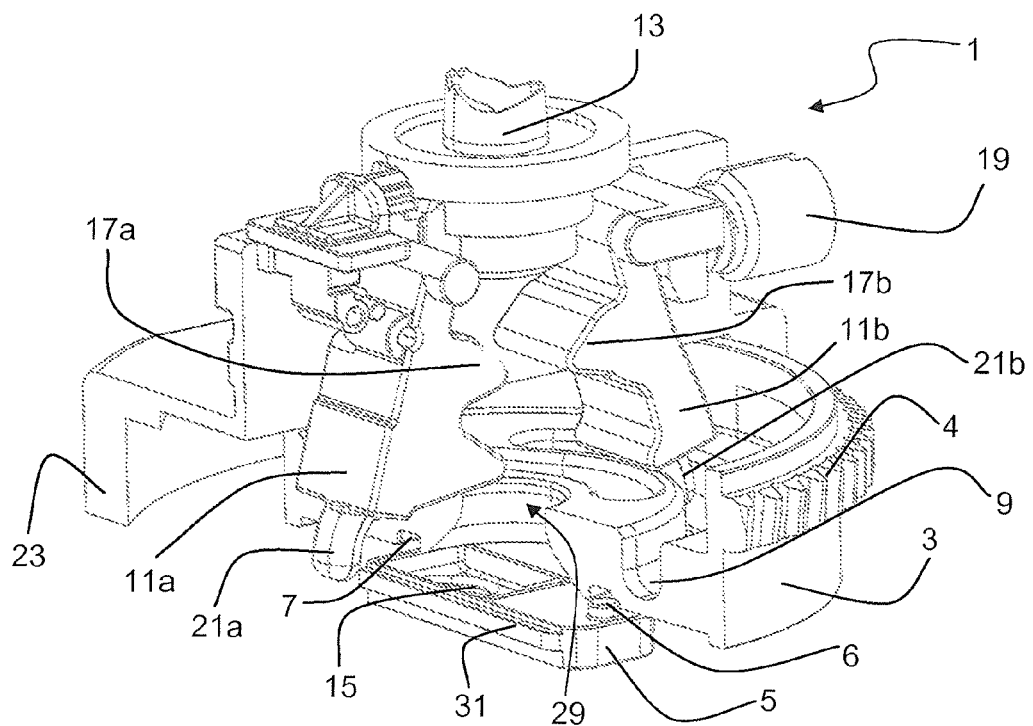
FIG. 1 a partial section view of a tube valve according to the invention with the omission of the conduit, FIG. 2 a further view of the tube valve, FIG. 3 a polar view of the same tube valve, FIG. 4 a top view of the tube valve, FIG. 5a a first sectional view of the tube valve along an intersection A'-A from FIG. 4, FIG. 5b a second sectional view along an intersection B-B from FIG. 4, FIG. 6a a first sectional view of the tube valve along the intersection A'-A from FIG. 4 in a second function setting, FIG. 6b a second sectional view along the intersection B-B' in the second function setting, FIG. 7a a sectional view along the intersection A'-A in a third function setting, FIG. 7b a second sectional view along the intersection B-B' in the third function setting, FIG. 8 a longitudinal section of a flow tube of an alternative design of a tube valve according to the invention.

FIG. 1 shows the inside of an example of a design of a tube valve according to the invention 1. Two clamping levers 11a and 11b are swivel-mounted in a housing 23, which are fitted with pinch jaws 17a and 17b respectively which point towards the inside of the housing. Both clamping levers 11a and 11b are swivel mounted in the upper area of FIG. 1, whereby one of the clamping levers 11b can be moved horizontally against a spring (not shown). An adjustment screw 19 is provided for the variation of the spring resistance of the spring. Guide lugs 21a and 21b are placed at the ends of the clamping levers 11a and 11b opposite the mounts.

A cogwheel 3 with a row of teeth 4 which can be rotated below vertical axle below the clamping lever 11a and 11b is arranged in such a way that the guide lugs 21a and 21b grip onto a pinch jaw guide built on the upper side of the cogwheel 3, in the shape of two embedded, sliding nuts 9. The nuts 9 glide both respectively from the inside of the wheel 3 towards the outside, so that when the cogwheel 3 is rotated, the clamping levers 11a and 11b are basically guided horizontally and in a straight line towards the outside.

On the lower side of the cogwheel 3 a flow changing device is fitted, which includes a movable slide 5 which serves to move the clamping levers 11a and 11b horizontally and vertically. The side of the slide 5 is fitted with an aligning guide 31, along which it can be moved in a straight line inside the housing. To control the reciprocating motion the lower side of the cogwheel 3 is fitted with a guide rail 7, which works in conjunction with a tap 6 fitted to the upper side of the slide 5. According to the setting of the cogwheel 3, the slide 5 may also have different positions.

A conduit (not shown) was guided vertically downwards from the upper side of the tube valve 1, on which a tapping device 13 for beverage cartridges is positioned, along both pinch jaws 17a and 17b. Cogwheel 3 therefore has an aperture 29 in the middle, through which the conduit can be fed, in the same way that slide 5 has an guide aperture 15.

Depending on the rotational setting of the cogwheel 3, the clamping lever 11a and 11b are positioned differently, and the pinch jaws 17a and 17b are thus either opened or closed, so that the conduit remains either fully or partially opened or fully closed. Through the spring mount of the clamping lever 11b, the contact pressure of its pinch jaw 17b can be varied, allowing tolerances in the thickness and elasticity of the conduit to be compensated. If the pressure in the conduit is too high, the spring mount also serves the purpose of allowing the relief of excess pressure. At the same time, also depending on the rotational setting of the cogwheel 3, can also be pointed in different directions with the aid of slide 5.

Figure 2:
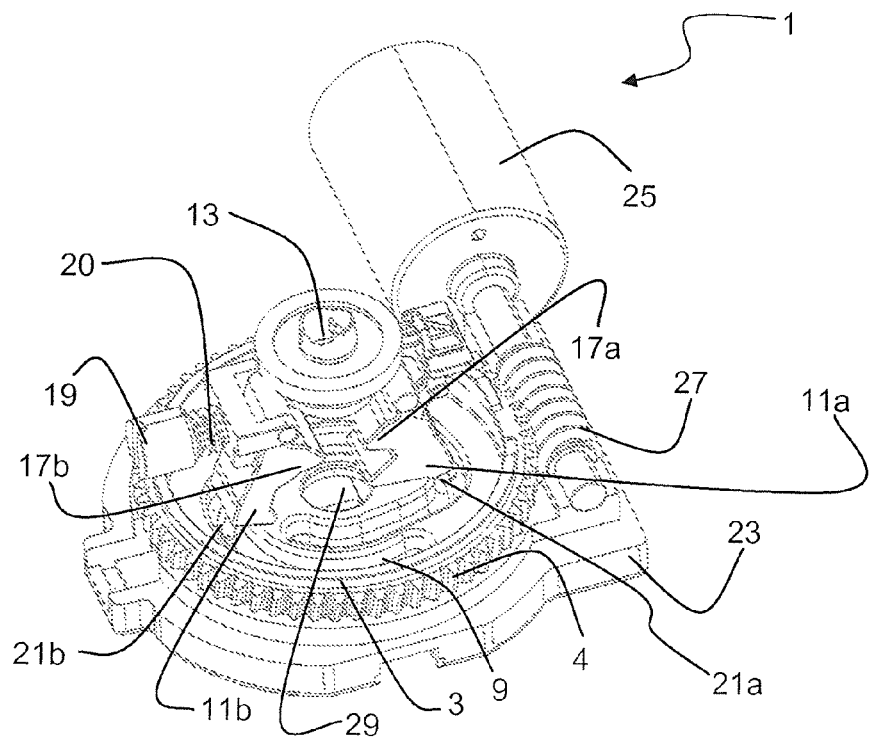

FIG. 2 shows the same tube valve 1 in parts in a perspective view from above. In addition to the already described elements spring 20 can also be seen, which affects clamping lever 11b. A actuating motor 25 varies the setting of the cogwheel 3 through a worm wheel 27. This allows cogwheel 3 to be moved depending on the various functions available on the coffee machine.

Figure 3:
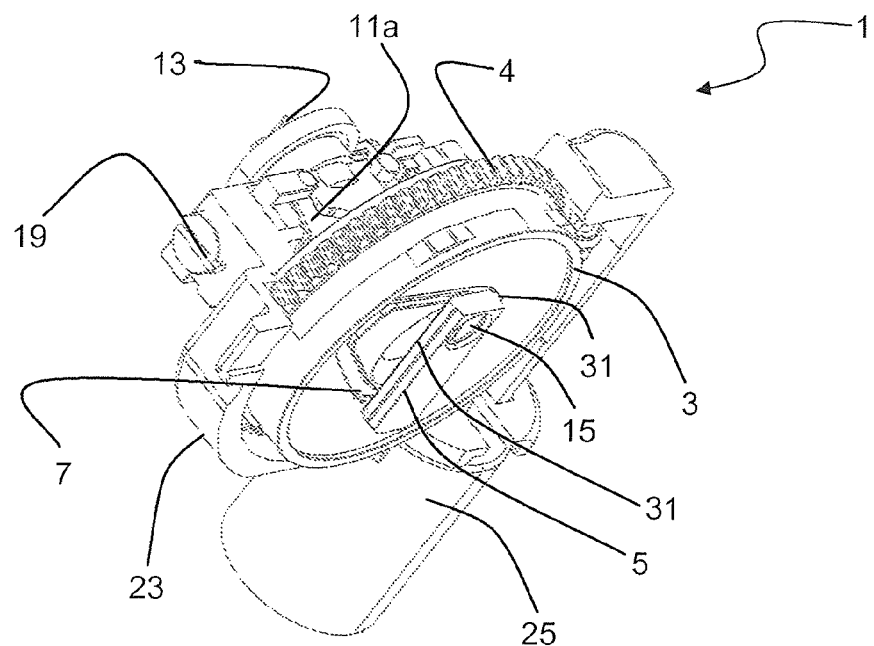

FIG. 3 shows the same tube valve 1 viewed from the lower side. This makes it particularly easy to recognise the shape of the guide rail 7 for slide 5. This is designed in such a way that tap 6 of the slide 5 can be placed either very close to the centre of the cogwheel 3 or on its external border. With the aid of the guide rail, the slide 5 can thus be moved back and forth between the extreme opposite central or external positions. In its guide aperture 15, it carries the conduit along so that this can point in different directions and for example connect to different channels, depending on the setting of the cogwheel.

Figure 4:
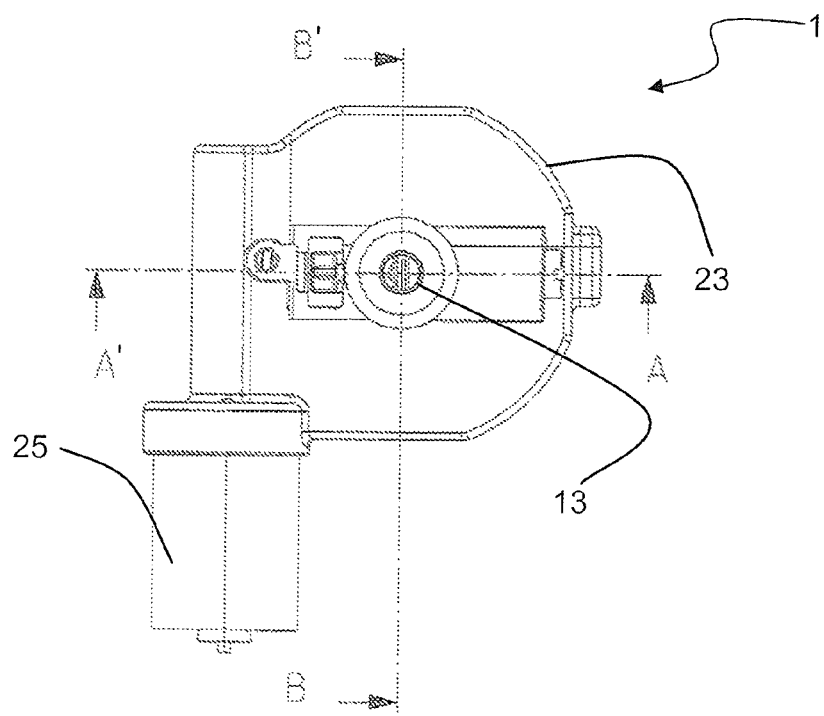

FIG. 4 serves to illustrate the perspective views of the subsequent FIGS. 5a to 7b. It shows a top view of the same tube valve and two sectional planes A'-A and B-B', which are used below to illustrate the different settings of the conduit.

Figure 5A:
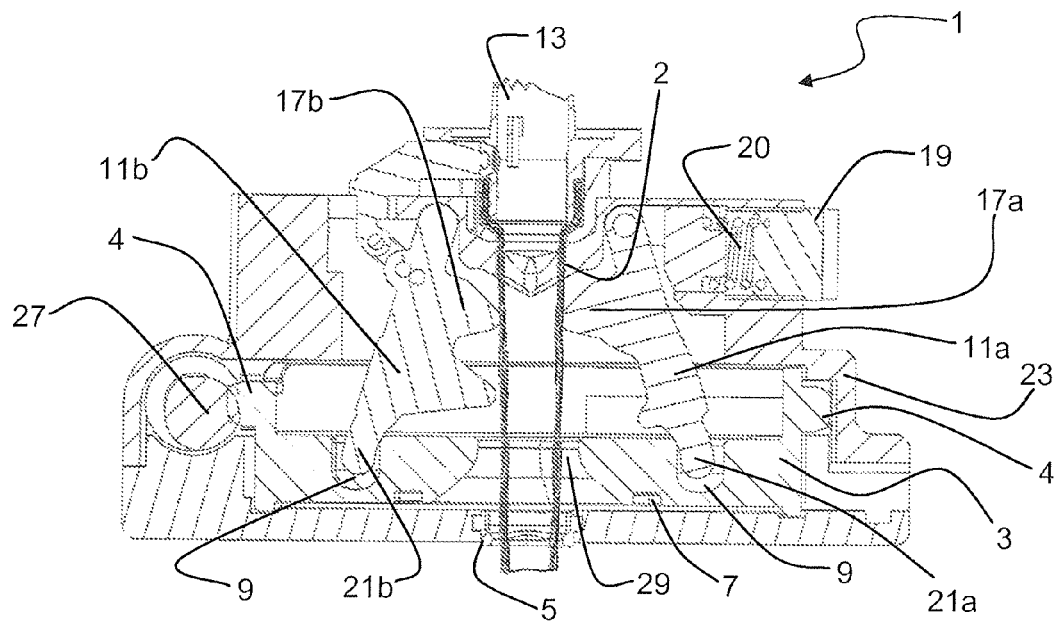
Figure 5B:
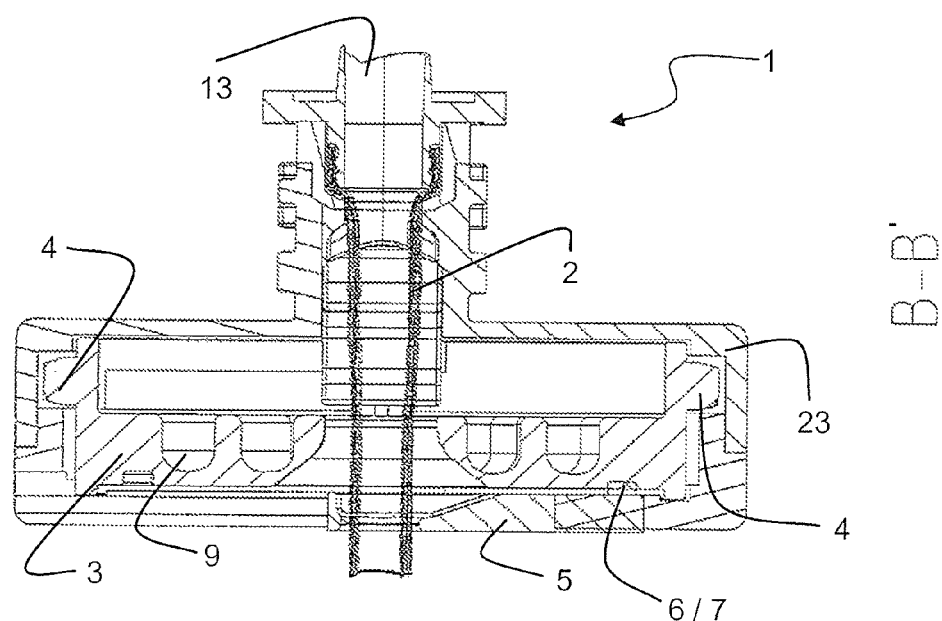

FIGS. 5a and 5b show the tube valve 1 according to the invention with a conduit 2 in a first function setting, namely the drainage function with the conduit 2 in the open position. The conduit 2 is not pinched by the pinch jaws 17a and 17b. Slide 5 is set in such a way that the conduit 2 lies perfectly vertically in a downward direction.

Figure 6A:
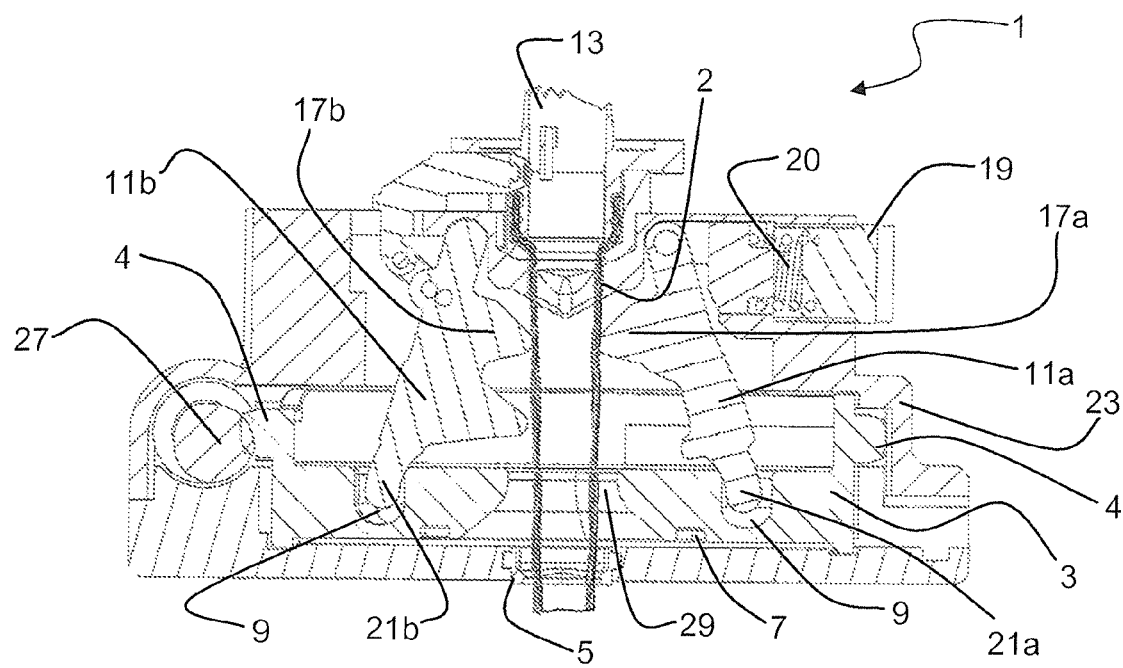
Figure 6B:
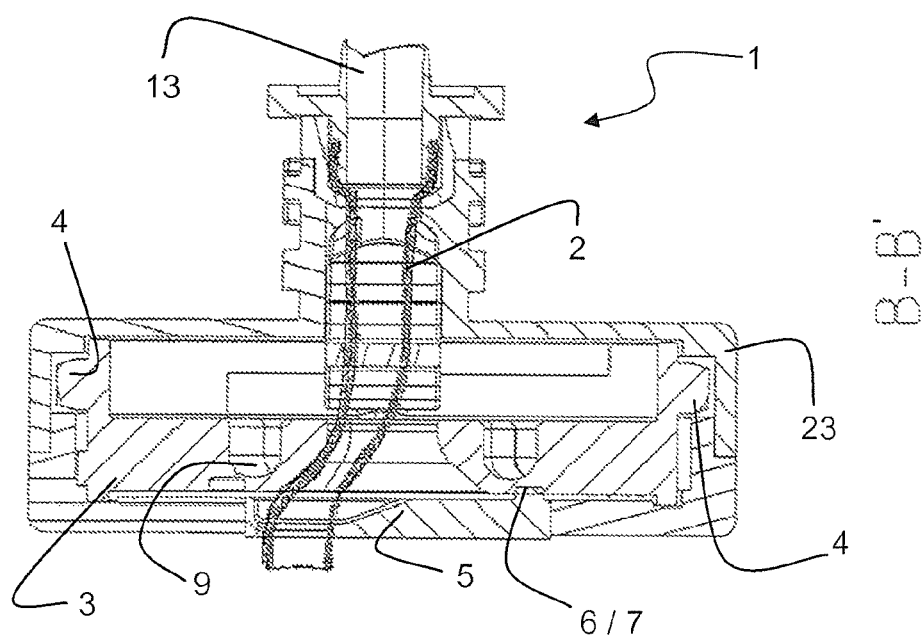

FIGS. 6a and 6b, on the other hand, show the tube valve 1 in a second function setting, namely for the preparation of beverages with conduit 2 in the open position. Conduit 2 on the other hand is not pinched by pinch jaws 17a and 17b. Slide 5, however, is displaced horizontally in comparison to FIG. 5b. This means that conduit 2 points in another direction at its lower end compared to FIG. 5b. It now points in the direction of a beverage pouring spout of the coffee machine.

Figure 7A:
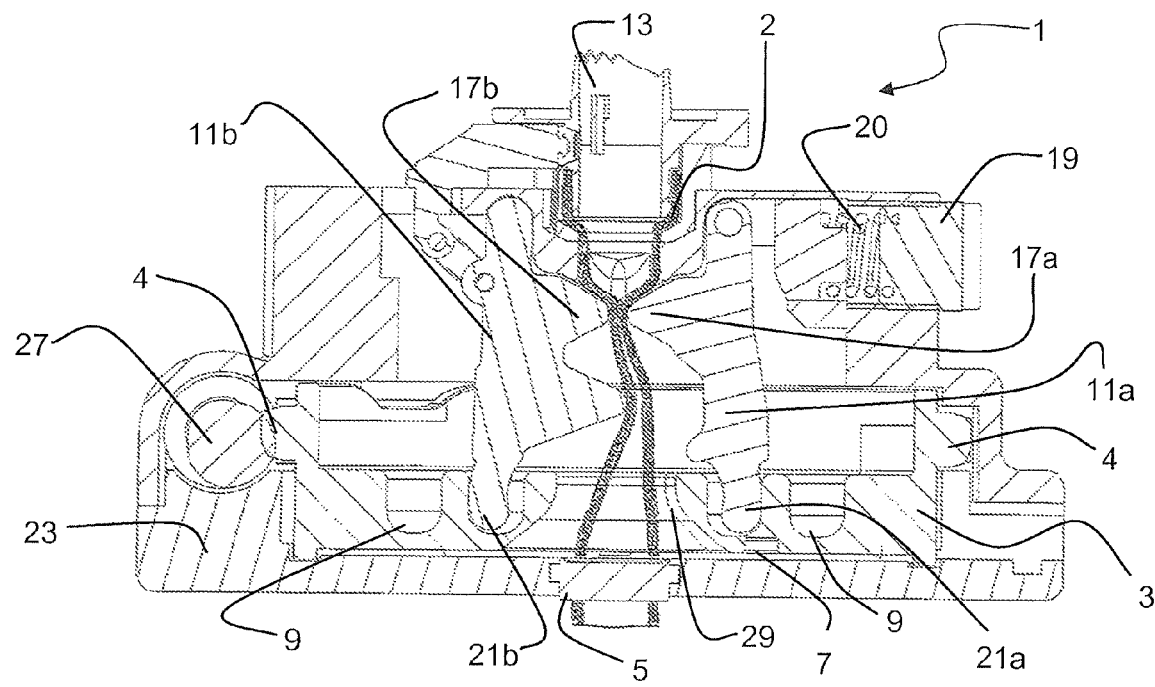
Figure 7B:
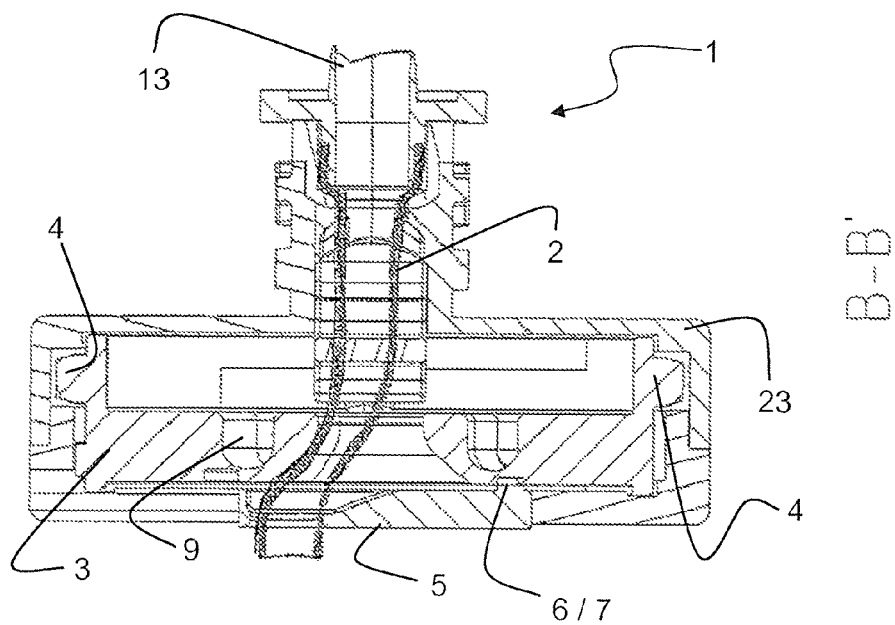

The direction of the conduit 2 in FIG. 7b is, on the other hand, the same as in FIG. 6b. In FIG. 7a, on the other hand, the conduit 2 is now fully disconnected with the aid of both pinch jaws 17a and 17b. It is disconnected, for example, after termination of a brewing and coffee dispensing process, in order to avoid subsequent dripping. This third function setting could now lead to the first function setting according to FIGS. 5a and 5b, in other words to drainage. This function setting is reached automatically once more by a simple rotation of cogwheel 3. Slide 5 is coupled with cogwheel 3 through guide rail 7 and pinch jaws 17a and 17b are couple with cogwheel 3 through pinch jaw guide 9. This leads to a direct coupling of slide 5 and pinch jaws 17a and 17b. The change of the setting of the cogwheel 3 thus automatically causes a simultaneous change in the position of both elements.

Figure 8:
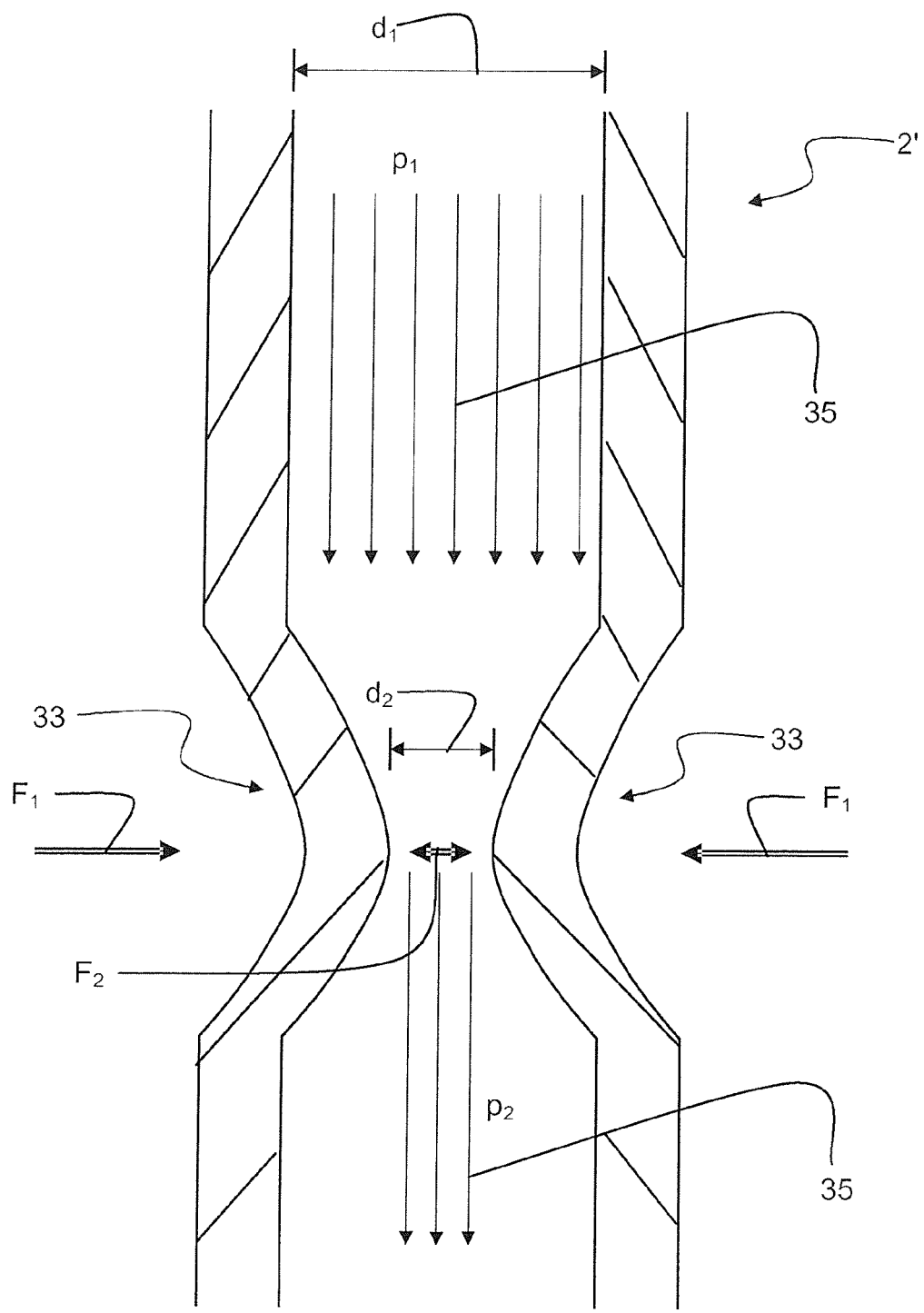

FIG. 8 illustrates the longitudinal section of a conduit 2', which can be used to create an alternative shape of a tube valve according to the invention. The conduit 2' is made from a material which has excellent stiffness, in order to withstand high pressures in the region 6 bar or higher. This can be made, for example, with the aid of fibroid reinforcements in the tube 2', or by selecting a sufficiently dimensionally stable plastic with a suitable tube thickness. The conduit 2' has an elastic throat 33 which serves as an adjustment device, in the area of which the inner diameter of the tube 2' is reduced from a normal diameter $d_1$ to a narrow diameter $d_2$.

If a liquid 35 is pumped through the conduit 2' with an initial pressure $p_1$, the throat 33 acts as a restrictor. Due to the stiffness of the material of the conduit 2, in the area of the throat 33, a restricting force $F_1$ is exerted towards the inside of the tube. Due to an initial pressure $p_1$ in the flow direction before the throat 33, a counter force $F_2$ is exerted against restricting force $F_1$, which leads to an increase in the throat diameter $d_2$. By way of example, the conduit 2' in the area of the throat 33 can be completely closed, until a sufficiently high initial pressure $p_1$ is reached, for example of approximately 6 bar. Then the throat 33 opens due to the counterforce $F_2$, so that the liquid 35 can flow through. Downstream of the throat 33 there is a predominantly reduced pressure $p_2$ which is more or less equivalent to atmospheric pressure.

When a conduit 2' is used with such a stable design and shape, the use of pinch jaws as described above can be dispensed with. The conduit 2', in fact, regulates the flow automatically, without any additional force from outside.

As the above elements described in detail of the tube valve are design examples, they can be modified by experts in the field in the usual way to a large extent, without abandoning the scope of the invention. In particular, also the concrete pinch jaw designs can be made in a different shape from those described herein. Likewise, the control of the pinch jaws and the flow changing device can be designed differently, if this is necessary for reasons of space or out of design-related or functional reasons. Furthermore, the use of the undefined article "a" does not exclude the fact that the features concerned might also be available in multiple forms.

LIST OF REFERENCE NUMERALS 1 tube valve
2, 2' conduit
3 cogwheel
4 row of teeth
5 slides
6 taps
7 guide rail
9 pinch jaw guide—nuts
11a and 11b clamping lever
13 tapping device
15 guide aperture
17a, 17b pinch jaws
19 adjustment screw
20 spring
21a, 21b guide lugs
23 housing
25 actuating motor
27 worm wheel
29 aperture
31 aligning guide
33 throat
35 liquid
$d_1$ normal diameter
$d_2$ throat diameter
$F_1$ restricting force
$F_2$ counterforce
$P_1$ initial pressure
$P_2$ reduced pressure

The invention claimed is:

1. A coffee machine with a pinch valve, the pinch valve comprising: a conduit for liquids and/or gases, a flow adjusting device for adjusting a flow of liquid through the conduit, and a flow changing device which is configured to change an alignment of the conduit during operation, wherein the flow adjusting device comprises at least one pinch jaw and wherein the pinch jaw is coupled with the flow changing device.

2. The coffee machine according to claim 1, wherein the pinch valve is configured as a hot beverage dispenser, drainage-outlet or gas outlet.

3. The coffee machine according to claim 1, wherein pinching forces of the pinch jaw are regulated by a spring.

4. The coffee machine according to claim 1, further comprising a guide wheel with a guide rail for controlling the flow changing device.

5. The coffee machine according to claim 4, wherein the guide wheel comprises a pinch jaw guide for changing the at least one pinch jaw.

6. The coffee machine according to claim 1, further comprising a plurality of pinch jaws.

7. The coffee machine according to claim 1, wherein the pinch jaw is part of a clamping lever.

8. The coffee machine according to claim 1, wherein the conduit is connected permanently to a tapping device.

9. The coffee machine according to claim 1, wherein the pinch valve is configured as a drainage-outlet.

10. The coffee machine according to claim 1, wherein the pinch valve is configured as a gas outlet.

11. The coffee machine of claim 8, wherein the tapping device is removable from the housing.

12. A pinch valve for a coffee machine, the pinch valve comprising a conduit for liquids and/or gases, a flow adjusting device for adjusting a flow of liquid through the conduit, and a flow changing device which is configured to change an alignment of the conduit during operation, wherein the flow adjusting device comprises at least one pinch jaw and wherein the pinch jaw is coupled with the flow changing device.

* * * * *